3,632,603
PROCESS FOR THE PREPARATION OF $N_2$-DI-CHLOROPHOSPHORYL-CREATININE
Pierre Marie Joseph Obellianne, Paris, France, assignor to Ugine Kuhlmann, Paris, France
No Drawing. Filed Apr. 25, 1968, Ser. No. 724,265
Claims priority, application France, July 6, 1967, 113,273
Int. Cl. C07d 49/30
U.S. Cl. 260—309.7    3 Claims

ABSTRACT OF THE DISCLOSURE

Process for the preparation of $N_2$-dichlorophosphoryl-creatinine which comprises treating pulverulent creatinine at the boil with 10 to 100 times its weight of phosphorus oxychloride.

---

The present invention concerns a process for the preparation of $N_2$-dichlorophosphoryl-creatinine.

A process for the preparation of $N_2$-dichlorophosphoryl-creatinine of the formula:

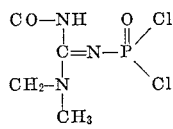

has already been described, which consists in treating creatine with a very large excess of phosphorus oxychloride at the boil (270 parts of phosphorus oxychloride to one part of creatine) and distilling off the excess phosphorus oxychloride under vacuum. An oily distillation residue is then obtained. When this residue is treated with diethyl ether, crystals are obtained, from which the desired product is extracted by means of a long extraction with the ethyl ether. The yield is poor and does not exceed 15% of the theoretical. On the other hand, it has been mentioned that $N_2$-dichlorophosphoryl-creatinine can be obtained by phosphorylation of creatinine with phosphorus oxychloride, but no precise phosphorylation process has been described. (Hoppe-Seylers Zeitschrift fuer physiologische Chemie, volume 252, pages 101–114).

The object of the present process is to obtain $N_2$-dichlorophosphoryl-creatinine with a yield superior to that indicated above and under conditions more easily attainable industrially, to obtain a product which crystallises easily, to avoid contingently the ethyl ether extraction, and to obtain a product which is directly usable for the preparation of the disodium salt of phospho-creatinine without passing through the barium salt as an intermediate. Other objects of the invention will appear from the description.

It has in fact been found that $N_2$-dichlorophosphoryl-creatinine can be obtained with a yield exceeding 50% of the theoretical by treating pulverulent creatinine with 10 to 100 times its weight of phosphorus oxychloride at the boil, preferably until solution is practically complete. Given the conditions for the phosphorylation of creatine mentioned above this result could not have been foreseen.

In order to carry out the process of the invention, the creatinine may be finely round until particles greater than 50 microns have disappeared as completely as possible, and if desired it may be passed through a sieve. It may then be suspended in the phosphorus oxychloride and the mixture brought to the boil, preferably with good agitation, and kept at the boil until the creatinine has practically completely dissolved.

To isolate the product, the phosphorus oxychloride is evaporated under vacuum. According to the conditions of this evaporation one may obtain a distillation residue which is partly crystallized or completely liquid. In the first case filtration, possibly after adding a solvent such as ethyl ether or a liquid aromatic hydrocarbon (e.g. benzene, toluene or xylene) or a liquid halogenated derivative of an aromatic hydrocarbon (e.g. chlorobenzene), allows one to isolate a crude $N_2$-dichlorophosphoryl-creatinine. In the second case, one may proceed in various ways. Thus one can subject the mass to precipitation by adding a solvent such as one of those mentioned above; or one can dissolve the distillation residue in a solvent such as 1,2-dichloroethane and isolate the $N_2$-dichlorophosphoryl-creatinine by fractional precipitation by means of a solvent in which it is insoluble. The crude $N_2$-dichlorophosphoryl-creatinine obtained by one or other of these processes may be used as it is or after purification. The methods of purification which may be used are particularly, extraction, recrystallization, or dissolving in a solvent followed by reprecipitation.

As a solvent which may be used for extraction, one can mention for example ethyl ether, isopropyl ether, dioxane, 1,2 - dichloroethane, 1,2 - dichloropropane. As a solvent which may be used for recrystallization one may mention for example benzene, toluene or a solvent in which the difference in solubility, in the hot and the cold, of $N_2$-dichlorophosphoryl-creatinine is sufficient and as a solvent in which $N_2$-dichlorophosphoryl-creatinine is soluble in the cold, one may mention for example 1,2-dichloroethane. As a solvent in which $N_2$-dichlorophosphoryl-creatinine is insoluble and which can for this reason be used for the precipitation of the product starting with its organic solutions, one may mention for example hexane, heptane, or petrol ether.

The $N_2$-dichlorophosphoryl-creatinine obtained according to the present process is of excellent quality, and it may be used directly for the preparation of phospho-creatininates of sodium, potassium, magnesium, lithium or other metals or of organic bases, without passing through the barium salt as an intermediate. These salts may be used in pharmacy as anti-fatigue agents according to U.S. Pat. No. 3,114,674 or in the feeding of live stock, in order to stimulate the growth of the animals according to French Pat. No. 1,484,664 (U.S. patent application Ser. No. 615,393 filed Feb. 13, 1967).

The following examples, in which the parts indicated are parts by weight unless the contrary is mentioned, are purely illustrative.

EXAMPLE 1

5 parts of creatinine passed through a sieve of standard unit 18 are suspended in 200 parts, freshly distilled in vacuo, of phosphorus oxychloride in an apparatus provided with a stirrer rotating at 700 revolutions a minute and protected from the humidity of the air by a calcium chloride trap. The suspension is heated under reflux at 108° C. for 45 minutes at which time the solubilisation of the creatinine is completed. Heating under reflux is continued for a further 15 minutes, making 1 hour altogether, then the product is cooled. Excess phosphorus oxychloride is distilled off in vacuo by heating at 35 to 40° C., and the distillation residue is in the form of a yellowish oil (16 parts by weight). This is triturated for some minutes with anhydrous ethyl ether, when it solidifies. The mass is filtered, washed with ethyl ether, then dried under vacuum over phosphoric anhydride and caustic soda pellets. The $N_2$-dichlorophosphoryl-creatinine is extracted from the residue in a Kumakawa type apparatus by anhydrous ethyl ether for 27 hours. It forms colourless crystals which are separated by filtration, washed with ethyl ether, then dried under vacuum over phosphoric anhydride. 5.2 parts of $N_2$-dichlorophosphoryl-creatinine are obtained, that is, a yield of 51.5% of theory from the creatinine.

Melting point of this dichlorophosphoryl derivative: 132–134° C. The melting point given in the literature is 128–131° C.

This product fumes in the air, liberating hydrochloric acid and it is expedient to keep it out of contact with moisture. This product can be converted directly into the disodium salt of the phosphocreatinine in the following way:

5.2 parts of finely ground $N_2$-dichlorophosphoryl-creatinine are introduced with stirring into 45 parts by volume of an 80 g. per litre solution of caustic soda cooled to between —5° C. to 0° C. The solution is progressive and is only slightly exothermic. The temperature remains in the vicinity of 0° C., and after 30 minutes stirring, all the $N_2$-dichlorophosphoryl-creatinine has dissolved. The disodium salt of the phosphocreatinine is precipitated at once by 180 parts by volume of denatured ethyl alcohol. An oil is formed which crystallises fairly rapidly, and after stirring for 3 hours at between 0° C. and +5° C. the precipitate is filtered off and washed successively with 10 parts by volume of 80% ethyl alcohol, 10 parts of ethyl alcohol and 10 parts of anhydrous ether. It is dried for 15 hours over phosphoric anhydride under vacuum, and 4.75 parts of the disodium salt of the phosphocreatinine crystallised with two molecules of water and of a very slightly cream shade are thus obtained. Yield: 39.4% calculated from the creatinine.

EXAMPLE 2

A mixture comprising 200 parts, freshly distilled in vacuo, of phosphorus oxychloride and 5 parts of finely ground creatinine is heated under reflux for 45 minutes with good stirring in an apparatus protected from moisture. After cooling, a small quantity of insoluble material is filtered off and the excess phosphorus oxychloride is distilled off in vacuo, that is 180 to 190 parts, which may be used again in a new phosphorylation reaction. 12 parts by weight of a yellow oil are obtained. 50 parts by volume of anhydrous ethyl ether are added thereto and the mixture is triturated. The oil solidifies, the crystals obtained are filtered off, washed with 10 parts by volume of anhydrous ether and dried over phosphoric anhydride in vacuo, 7.5 parts of crude $N_2$-dichlorophosphoryl-creatinine being thus obtained. This is ground and purified by extraction with 75 parts by volume of anhydrous dichlorethane, the extraction being effected in the cold with stirring for 1 hour in a closed apparatus. The insoluble hydroscopic material is filtered off, then washed on the filter with 10 parts by volume of dichlorethane, and the filtrate is concentrated to dryness under vacuum by heating at 30–35° C. The residue forms a colourless crystalline powder. 5.2 parts of $N_2$-dichlorophosphoryl-creatinine M.P. 131–132° C., are thus obtained. Yield: 51.5% of theory.

EXAMPLE 3

A mixture comprising 200 parts of freshly distilled phosphorus oxychloride and 10 parts of finely ground creatinine is heated in an apparatus provided with an ordinary condenser, with vigorous stirring and with slight distillation, while 100 parts of phosphorus oxychloride are gradually introduced to compensate for that which is distilled. The time for solution to occur is 45 minutes. After cooling, the excess of phosphorus oxychloride is distilled at 30° C. in vacuo until the residue weighs 31 parts. The residue is diluted with 100 parts of dichlorethane and an impurity is precipitated on adding 50 parts of hexane. The upper clear layer is run into 150 parts by volume of hexane, and after cooling for 1 hour in ice water, it is filtered off, washed on the filter with a little hexane and dried in vacuo over phosphoric anhydride. 11 parts of $N_2$-dichlorophosphoryl-creatinine are obtained with a yield of 54.5% calculated from the creatinine.

EXAMPLE 4

20 parts of creatinine passed through a sieve of standard unit 18 are suspended in 800 parts of freshly distilled phosphorus oxychloride recovered from a previous operation, in an apparatus provided with a stirrer rotating at 500 revolutions per minute and protected from the moisture of the air by a calcium chloride trap. After 45 minutes heating under reflux at 106–108° C., the solution of the creatinine is complete. Heating is continued for a further 15 minutes, making 1 hour altogether, and the mixture is then cooled and the excess phosphorus oxychloride is distilled off in vacuo by heating at a temperature below or equal to 25° C. The distillation residue forms a partially solid mass of a creamy yellow colour, weighing 60 to 70 parts. 40 parts by volume of anhydrous toluene are added to the distillation residue. The $N_2$-dichlorophosphoryl-creatinine separates in crystalline form, and is filtered off and made into a paste on the filter in 40 parts by volume of toluene, then filtered off and washed on the filter successively with 10 parts by volume of toluene and 20 parts by volume of hexane, and dried in vacuo over phosphoric anhydride, 24 parts of crude $N_2$-dichlorophosphoryl-creatinine being obtained which is directly utilisable as in Example 1 for the conversion into the disodium salt of phosphocreatinine.

The $N_2$-dichlorophosphoryl-creatinine obtained can also be purified by dissolving in 200 parts by volume of anhydrous dichlorethane heated at 25–30° C. for 1 hour in a closed vessel with vigorous stirring. An insoluble impurity is filtered off in the cold, then washed with 10 parts of dichlorethane. The filtrate is concentrated in vacuo to a volume reached until a pulp is formed, then 50 to 100 parts by volume of hexane are added according to the volume of the residue, and the solid is filtered off, washed on the filter with a little hexane and dried in vacuo over phosphoric anhydride and caustic soda pellets. 21.5 parts by weight of purified $N_2$-dichlorophosphoryl-creatinine are obtained, that is a yield of 52% of theory calculated from the creatinine. It is in the form of a colourless crystalline powder which it is expedient to keep out of contact with moisture from the air.

EXAMPLE 5

The procedure is begun as in Example 4, but the phosphorus oxychloride is disttiled in vacuo at 30° C. The residue is in the form of a slightly yellowish oil. 200 parts by volume of anhydrous dichlorethane are then added and the oily residue is completely dissolved. This solution is introduced into a separating funnel with 100 parts by volume of hexane; impurities are precipitated forming an oil which after standing for 6 hours is separated. The clear solution is run into 300 parts by volume of hexane. The $N_2$-dichlorophosphoryl-creatinine precipitates at first in an oily form and solidifies progressively on cooling; it is filtered off and washed with a little hexane. After drying in vacuo, 30 parts of crude $N_2$-dichlorophosphoryl-creatinine are obtained. This may be purified by dissolving in 160 parts by volume of anhydrous dichlorethane in a closed vessel with vigorous stirring. After separation of an insoluble impurity by filtration, the $N_2$-dichlorophosphoryl-creatinine is precipitated with 400 parts by volume of hexane, forming an oily mass which crystallises progressively. It is filtered off, washed on the filter with a little hexane and dried over phosphoric anhydride and caustic soda pellets in vacuo. 20 to 22 parts of purified $N_2$-dichlorophosphoryl-creatinine are obtained, that is an average yield of 58% of theory calculated from the creatinine.

EXAMPLE 6

The procedure is begun as in Example 4 and the oily distillation residue is triturated with 200 parts by volume of anhydrous ethyl ether. After some time crystallisation occurs. The crystals obtained are filtered off and washed on the filter with 40 parts of volume of anhydrous ether.

After drying over phosphoric anhydride in vacuo, 30 parts of crude $N_2$-dichlorophosphoryl-creatinine are obtained. This is ground and purified by extracting with 300 parts by volume of anhydrous dichlorethane in the cold or at 25–30° C. in a closed vessel. An insoluble impurity is filtered off, then washed on the filter with 40 parts by volume of dichloroethane, and the filtrate is evaporated to dryness by heating at 30–35° C. in vacuo. 20.8 parts of $N_2$-dichlorophosphoryl-creatinine of M.P. 131° C. are thus obtained in the form of an almost colourless, slightly cream, crystalline powder with a yield of 51.5% of theory.

EXAMPLE 7

The procedure is as in Example 6 but the crude $N_2$-dichlorophosphoryl-creatinine obtained is separated from its impurities by extracting with anhydrous ethyl ether in a Kumakawa type apparatus for 27 hours. Colourless crystals are formed which are separated by filtration, washed with ethyl ether, then dried over phosphoric anhydride in vacuo. 20.8 parts of $N_2$-dichlorophosphoryl-creatinine are obtained with a yield of 51.5% of the theory calculated from the creatinine. The melting point of the product is 132° C.

EXAMPLE 8

A mixture comprising 10 parts of finely ground creatinine and 400 parts of freshly distilled phosphorus oxychloride is heated under reflux for 2 hours with vigorous stirring. Then excess phosphorus oxychloride is distilled off by heating at 30° C. in vacuo, 31 parts by weight of residual oil resulting from the distillation. This is triturated with 100 parts by volume of anhydride ethyl ether, and a resinous mass is obtained which is dried over phosphoric anhydride in vacuo. 20.7 parts by weight of crude $N_2$-dichlorophosphoryl-creatinine are obtained, and it is purified by extraction with 200 parts by volume of dichloroethane for 1 hour in the cold with stirring in a closed apparatus. The insoluble impurity is filtered off and washed on the filter with 40 parts by volume of dichloroethane, and the filtrate is concentrated by heating at 35° C., in vacuo. 10.8 parts of $N_2$-dichlorophosphoryl-creatinine are thus obtained with a yield of 53.5% calculated from the creatinine.

EXAMPLE 9

800 parts of freshly distilled phosphorus oxychloride containing 20 parts of finely ground creatinine are heated under reflux with stirring until solution occurs, and the excess phosphorus oxychloride is then distilled off by heating at 30° C. in vacuo. The distillation residue, weighing 67 parts, is dissolved in 200 parts by volume of cold 1,2-dichloroethane. After the introduction of 100 parts by volume of hexane, impurities are precipitated and are separated in the form of an oily liquid by decantation. The separated solution is then run into 300 parts by volume of hexane cooled to between 5° C. and 10° C. After 30 minutes at this temperature, the hexane is siphoned off and the precipitate separated, and the latter is dried and then dissolved partially in 160 parts by volume of dichloroethane at a temperature of 25° C. to 30° C .with stirring. An insoluble impurity is filtered off, washed with a little dichlorethane, and the filtrate is run into 300 parts by volume of hexane cooled to between 5° C. and 10° C. The mixture is stirred for 1 hour at this temperature, then the solid is filtered off and washed on the filter with a little hexane. 20 parts of $N_2$-dichlorophosphoryl-creatinine of melting point 131° C. are obtained with a yield of approximately 50% calculated from the creatinine.

EXAMPLE 10

A mixture comprising 800 parts of freshly distilled phosphorus oxychloride and 20 parts of finely ground creatinine is heated under reflux in an apparatus provided with a stirrer rotating at 800 revolutions per minute. After refluxing for 1 hour, the creatinine is completely dissolved. The solution is cooled and the excess phosphorus oxychloride is distilled off by heating at 20–25° C. in vacuo. The distillation residue, which is partly crystalline, weighs 66.5 parts, and it is taken up in 40 parts by volume of anhydrous toluene. The mass rapidly breaks up and crystallises, and the well crystallised precipitate is filtered off, made into a paste on the filter in 40 parts by volume of toluene, filtered off and washed on the filter successively with 10 parts by volume of toluene and 20 parts by volume of hexane. It is dried over phosphoric anhydride in vacuo, and 30 parts of $N_2$-dichlorophosphoryl-creatinine of melting point 128° C. are obtained with a yield of 74.5% calculated from the creatinine. This $N_2$-dichlorophosphoryl-creatinine is sufficiently pure to be converted directly into the disodium salt of phospho-creatinine by means of a solution of caustic soda as indicated in Example 1.

EXAMPLE 11

A mixture comprising 200 parts of freshly distilled phosphorus oxychloride and 5 parts of finely ground creatinine is heated under reflux for 30 minutes in an apparatus provided with a high-speed stirrer and protected from the moisture in the air. After solution is complete, the solution is cooled and the excess phosphorus oxychloride is distilled off at 25° C. and the partly solid and resinous distillation residue is taken up in 10 parts by volume of toluene. The well crystallised $N_2$-dichlorophosphoryl-creatinine is separated by filtration and washed on the filter with 4 parts by volume of toluene. The precipitate is dried over phosphoric anhydride in vacuo and 5.9 parts of crude product are obtained, which are recrystallised from 35 parts by volume of toluene heated to 80° C. Insoluble impurities adhere to the walls of the vessel. The solution is decanted into another vessel, and the $N_2$-dichlorophosphoryl-creatinine crystallises on cooling, and is filtered off in the cold and dried over phosphoric anhydride in vacuo. The purified $N_2$-dichlorophosphoryl-creatinine is obtained with a yield of approximately 50%, calculated from the creatinine.

EXAMPLE 12

One starts, as in Example 9, but one finishes the distillation of the phosphorus oxychloride by heating on a water bath at 40–45° C. The residue, which looks like a thick oil, weighs 58 parts which are taken up into solution by 40 parts by volume of anhydrous toluene; followed by precipitation of $N_2$-dichlorophosphoryl-creatinine which is filtered, and then washed on a filter successively with 40 parts by volume, then 10 parts by volume of toluene and finally with 20 parts by volume of hexane. One obtains 37 parts of crude $N_2$-dichlorophosphoryl creatinine which are then purified by extraction with 200 parts by volume of dichlorethane being stirred for 1 hour at 30° C. in a closed apparatus. One filters off 7 parts of an insoluble impurity, washes on the filter with a little dichlorethane and concentrates the filtrate under vacuum at a temperature of 30–35° C. to a reduced volume. One adds 2 parts by volume of hexane, based on the volume of the concentrated solution, filters, washes on the filter with a little hexane and dries under vacuum and obtains 20 parts of $N_2$-dichlorophosphoryl-creatinine of M.P. 127–128° C.

I claim:
1. Improvement in the process for the preparation of $N_2$-dichlorophosphorylcreatinine which comprises:
   treating pulverulent creatinine at the boil with 10 to 100 times its weight of phosphorus oxychloride,
   evaporating unreacted phosphorus oxychloride in vacuo after the reaction,
   extracting $N_2$-dichlorophosphorylcreatinine by 1,2-dichloroethane from the residue after evaporation,
   and isolating said $N_2$-dichlorophosphoryl-creatinine from the solution thus obtained by fractional precipitation by means of a solvent in which it is insoluble.

2. Improvement in the process for the preparation of $N_2$-dichlorophosphorylcreatinine which comprises:
   treating pulverulent creatinine at the boil with 10 to 100 times its weight of phosphorus oxychloride until solution is practically complete,
   evaporating unreacted phosphorus oxychloride in vacuo after the reaction to obtain a residue,
   mixing the residue after evaporation with a liquid aromatic hydrocarbon or a halogenated liquid aromatic hydrocarbon whereby the $N_2$-dichlorophosphorylcreatinine separates in crystalline form,
   and filtering said $N_2$-dichlorophosphorylcreatinine after crystallization.

3. Process according to claim 2 wherein the pulverulent creatinine is substantially free of particles greater than 50 microns.

References Cited

UNITED STATES PATENTS

| | | | |
|---|---|---|---|
| 2,305,501 | 12/1942 | Spielman | 260—309.5 |
| 2,417,326 | 3/1947 | Schnider et al. | 260—309.7 |
| 2,914,538 | 11/1959 | Randall et al. | 260—309.5 |
| 3,036,088 | 5/1962 | Harris | 260—309.5 |

OTHER REFERENCES

Morton: Laboratory Technique in Organic Chemistry, pp. 147–9 N.Y., McCraw-Hill, 1938. Tipson in: Weissberger Technique of Organic Chemistry, Vol. III, pp. 471–82 N.Y., Interscience, 1950.

Zeile et al.: Chem. Abst., Vol. 32, Column 4143 (1938).

Zeile et al.: Hoppe-Seyler's Zeit Physical Chem., Vol. 252, pp. 101–14 (1938).

NATALIE TROUSOF, Primary Examiner

U.S. Cl. X.R.

260—999